(12) United States Patent
Park

(10) Patent No.: US 6,275,951 B1
(45) Date of Patent: *Aug. 14, 2001

(54) RESET SIGNAL CONTROL CIRCUIT OF A ONE-CHIP MICROCOMPUTER

(75) Inventor: Yong-Seung Park, Taegu (KR)

(73) Assignee: Hyundai Electronics Industries Co., Ltd., Kyoungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,687

(22) Filed: Aug. 18, 1998

(30) Foreign Application Priority Data

Nov. 22, 1997 (KR) .................................................. 97-62178

(51) Int. Cl.[7] ........................................................ G06F 1/04
(52) U.S. Cl. ........................... 713/500; 501/502; 501/600
(58) Field of Search ..................................... 713/500, 501, 713/600, 601, 502, 503

(56) References Cited

U.S. PATENT DOCUMENTS

| | | | | |
|---|---|---|---|---|
| 4,464,721 | * | 8/1984 | McKenna | 701/220 |
| 5,461,652 | * | 10/1995 | Hongo | 368/156 |
| 5,586,332 | * | 12/1996 | Jain et al. | 713/322 |
| 5,719,534 | * | 2/1998 | Imura | 331/186 |
| 5,907,699 | * | 5/1999 | Nakajima | 713/501 |
| 5,941,990 | * | 8/1999 | Hiiragizawa | 713/310 |
| 6,044,003 | * | 4/2000 | Toshinari et al. | 363/97 |

OTHER PUBLICATIONS

Appendix B. General Circuit Diagram GMS810 series, 8Bit Single Chip Microcomputers User's Manual, p. 18.

* cited by examiner

Primary Examiner—Richard Hjerpe
Assistant Examiner—Mackly Monestime

(57) ABSTRACT

This invention provides a reset signal control circuit of one-chip microcomputer including an interrupt signal which requires to stop temporarily a currently progressing operation and to perform a predetermined other operation; a clock oscillator which is enabled by an activated interrupt signal and generates clock signals with desired frequencies and widths according to an oscillation operation of an external oscillation means; a detection means which detects the frequencies and widths of the clock signals and produces the desired detected signals according to the detected values; a comparator which produces activated reset signals when enabled by the activated interrupt signal, compares a reference signal and a serial voltage, and maintains an activated state of the reset signal if the serial voltage is lower than the reference voltage and inactivates the reset signal if the serial voltage is higher than the reference voltage, offering effects to reduce the area occupied in the chip by constituting the reset signal control circuit using a rectifier and a comparator which occupies relatively small layout area and to reduce the test time by optimizing the time at which the operation of the exterior oscillation means is stabilized and an activating time of the interior reset signal.

6 Claims, 4 Drawing Sheets

RESET SIGNAL CONTROL CIRCUIT OF A ONE-CHIP MICROCOMPUTER

BACKGROUND OF THE INVENTION

1. Field of the Invention

The present invention relates to a reset signal control circuit of a one-chip microcomputer, and more particularly, to a reset signal control circuit for reducing the size of the chip and reducing the test time of the chip.

2. Discussion of the Related Art

A microcomputer is a kind of computer system usually used in data storage and retention, numerical computation, and control measurement of mechanical devices, and comprises memories, a central processing unit, peripheral devices and input/output(I/O) ports. Such a microcomputer can be implemented on a single chip as the semiconductor technologies has been developed, and particularly is referred to as a one-chip microcomputer.

FIG. 1 shows a structure of a one-chip microcomputer according to the prior art. A memory 1, a central processing unit(CPU) 2, a peripheral device 3 and an input/output port 4 are organically connected by address buses and data buses, enabling mutual exchanges of addresses and data. FIG. 1 also shows a clock oscillation circuit 5 for generating clock signals and a timer 10 which is necessary to control interior reset signals. Input signals of the clock oscillation circuit 5 includes an input oscillation signal XIN and an oscillation enable signal OSC, and an output signal includes an output oscillation signal XOUT. The input oscillation signal XIN is output from an oscillation means such as a crystal oscillator populated on a printed circuit board outside of the chip and provided to the inside of the chip, and the output oscillation signal XOUT is an oscillation signal which is provided to the oscillation means outside from inside of the chip. The oscillation enable signal OSC is a signal for driving the clock oscillation circuit 5, and its activation is determined by a power saving mode signal STP, an exterior reset signal RST_EX and an exterior interrupt signal /INTRP.

The power saving mode signal STP causes a power saving mode in which almost all of the hardware of the system is not operated when operation of the clock oscillation circuit 5 is stopped. Thus, in the power saving mode, the clock signal is not generated.

A construction of a logical gate for generating control signals of the clock oscillation circuit 5 in FIG. 1 is as follows. First, the exterior reset signal RST_EX is provided to an OR gate 7 and at the same time, the exterior interrupt signal /INTRP which is an active low signal is inverted and then provided to the OR gate 7. An output signal of the OR gate 7 is provided to another OR gate 8 together with the power saving mode signal STP. An output signal of the OR gate 8 is a control signal for controlling oscillating operation of the clock oscillation circuit 5.

In order to activate the oscillation enable signal OSC of the clock oscillation circuit 5 to a high level (to produce the power saving mode) both the power saving mode signal STP from the CPU 2 and the output of the OR gate 7 should be at a low level. As such, the exterior interrupt signal /INTRP should be at a high level and exterior reset signal RST_EX should be at a low level. That is, (the /INTRP signal goes to a low level, if an interrupt from the outside occurs in the power saving mode (the /INTRP signal goes to a low level); or if the system is reset (the RST_EX goes to a high level), the clock oscillation circuit 5 is enabled to operate.

The output oscillation signal XOUT from the clock oscillation circuit 5 is provided to the CLK input of the timer 10 for generating the interior reset signal RST_IN. And the exterior interrupt signal /INTRP is inverted and then provided to the START input of the timer 10 to be used as an operation start signal. That is, if the exterior interrupt signal /INTRP is activated as a low level, the timer 10 starts an operation, causing the interior reset signal RST_IN of high level to be output from the OR gate 6 and after a predetermined time, inactivating the interior reset signal RST_IN to be a low level. Another input of the OR gate 6 is an exterior reset signal RST_EX. Accordingly, if an interrupt the outside from the outside is occurred or the system is reset, the interior reset signal RST_IN is activated. The interior reset signal RST_IN is provided to the CPU 2, the peripheral device 3 and the I/O port 5, initializing the system.

An activating time of an activating signal (for outputting the interior reset signal RST_IN of the level from the OR gate 6) from the timer 10 is maintained until the oscillation operation of the clock oscillation circuit 5 is stabilized when the exterior interrupt signal /INTRP is activated in the power saving mode state. The reason is that a predetermined oscillation stabilization time is required until a stabilized level of the clock signal is output from the clock oscillation circuit 10. If the system starts its operation in the state that the clock oscillation circuit 5 is not yet stabilized, a normal operation of the system can not be expected because of a unstable level of the clock signal.

Accordingly, in the power saving mode, the timer 10 produces an activated interior reset signal RST_IN from the time when the exterior interrupt signal /INTRP is activated to the time after which the clock oscillator 5 has been stabilized even though the exterior interrupt signal /INTRP is activated and the operation of the clock oscillation circuit 5 is started. The clock oscillation circuit 5 is stabilized and produces a normal level output oscillation signal XOUT during the activating time of the interior reset signal RST_IN.

FIG. 2 shows a timing diagram representing the reset signal control operation of the prior art one-chip microcomputer. In FIG. 4, I represents a power saving mode signal (STP), II represents an output oscillation signal (XOUT), III represents an exterior interrupt signal (/INTRP), and IV represents an output signal (RST_IN) (i.e., interior reset signal) of the timer.

When the power saving mode signal I is in the low level, an oscillation operation is occurred in the clock oscillation circuit and thus the output oscillation signal II is a normal oscillation signal. However, when the power saving mode signal I is in the high level, the oscillation operation is not occurred in the clock oscillation circuit and thus the output oscillation signal II is in the low level. In the state that the power saving mode signal I is in the low level, when the exterior interrupt signal III is activated to the low level, the output signal IV of the timer goes to the high level. In this state, the output signal IV of the timer is inactivated again to the low level after a predetermined delay time set in the timer.

The time required for a clock stabilization is determined in consideration of the restriction of the frequency of a crystal oscillator, supply voltage and routing. When populating the one-chip microcomputer on a printed circuit board, the distance between the CPU of the chip and the oscillation means in the outside of the chip should be maintained as short as possible. However, if considering the position of the peripheral devices in an actual routing, the distance between the oscillation means and the CPU is far away, and thus the routing may be lengthened and also may be very complicated. Since such a long routing or such a complicated routing between the exterior oscillation means and the CPU may cause a pseudo oscillation hence, a normal operation of the oscillation means can not be expected.

Since an activating time of the interior reset signal RST_IN is continued in the timer 10 until the clock oscillation circuit 5 is sufficiently stabilized, a stabilized activating time of the reset signal is ensured by considering a constitution of the exterior circuit which was not optimized as described above and providing some marginal time in addition to the absolute time required for stabilizing the clock oscillation circuit 5.

However, a plurality of transistors are actually required in order to implement such a timer on an integrated circuit. Accordingly, since the area of the timer is very large, it causes the size of the whole chip to be increased. In order to ensure that the reset signal output by the timer goes to a low level after the clock oscillation is stabilized, the marginal time added to the absolute time necessary to stabilize the clock oscillation circuit 5 increases considerably. The marginal time increases the total test time of the chip.

SUMMARY OF THE INVENTION

Accordingly, the present invention is directed to a reset signal control circuit of a one-chip microcomputer that substantially obviates one or more of the problems due to limitations and disadvantages of the related art.

Another object of the present invention is to provide a reset signal control circuit using a rectifier and a comparator which occupy relatively small layout area of the circuit instead of a time (as in the Related Art), reducing the size of the chip and optimizing an amount of time needed to recognize a stabilized level of oscillation.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a reset circuit for a one-chip microcomputer, the circuit comprising: a clock oscillator to generate a clock signal, said clock oscillator being operable to reset in response to an external reset trigger; and a reset control circuit to indicate when said clock oscillator has completed a reset operation, said reset control circuit including a peak detector, responsive to said clock oscillator, to output a signal indicative of a peak value of said clock signal, and a comparator to output a reset signal indicative of whether a reset operation is complete by comparing said output of said peak detector against a reference voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the inventing and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The above described objects can be accomplished by an interrupt signal which requires to stop temporarily a currently progressing operation and to perform a predetermined other operation; a clock oscillator which is enabled by an activated interrupt signal and generates clock signals with desired frequencies and widths according to an oscillation operation of an external oscillation means; a detection circuit which detects the frequencies and widths of the clock signals and produces the desired detected signals according to the detected values; a comparator which produces activated reset signals when enabled by the activated interrupt signal, compares a reference signal and a serial voltage, and maintains an activated state of the reset signal if the serial voltage is lower than the reference voltage and inactivates the reset signal if the serial voltage is higher than the reference voltage.

Figure 1:
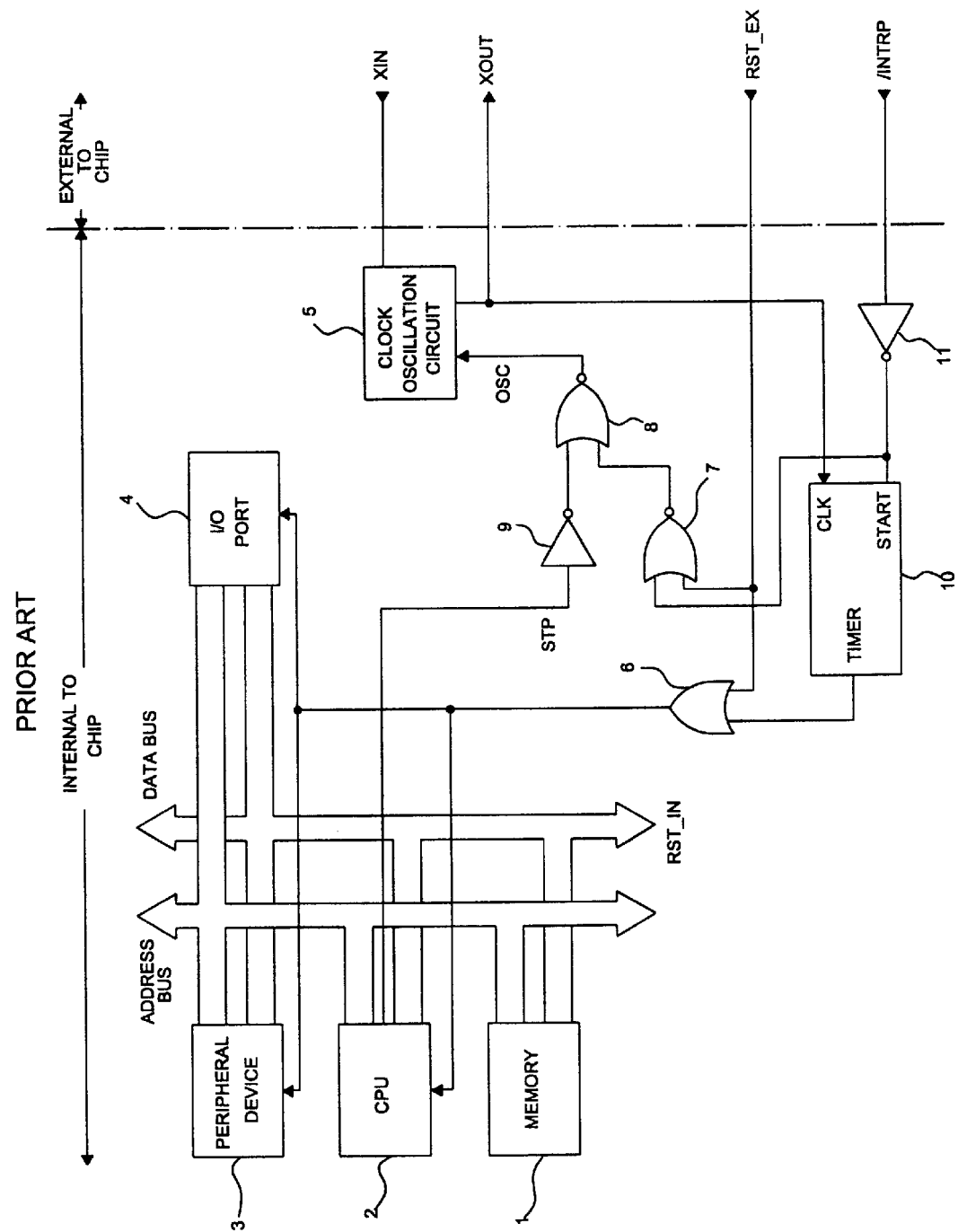
FIG. 1 is a constitution of a one-chip microcomputer according to the prior art.
Figure 2:
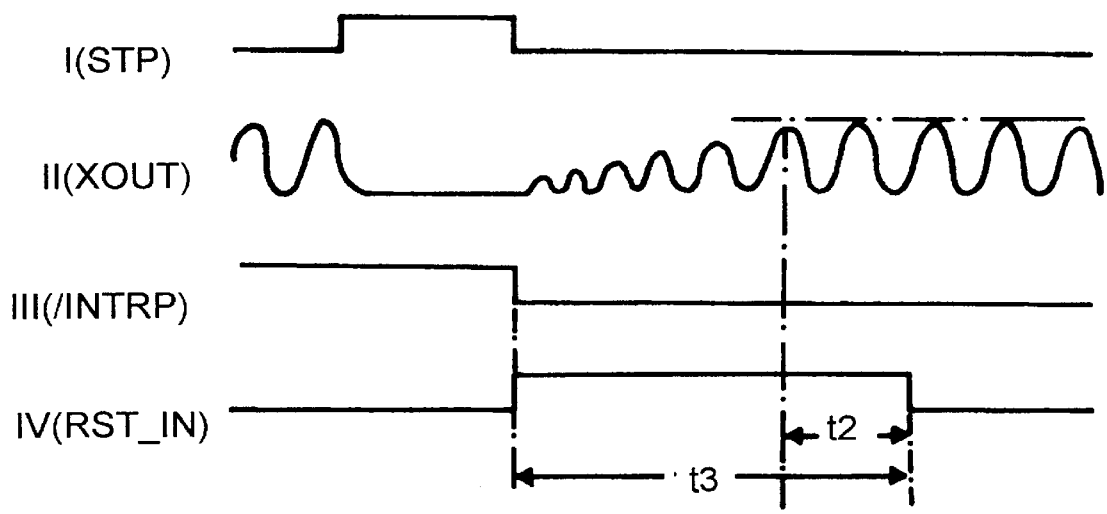
FIG. 2 is timing diagrams of reset signal control operations of the one-chip microcomputer according to the prior art.
Figure 3:
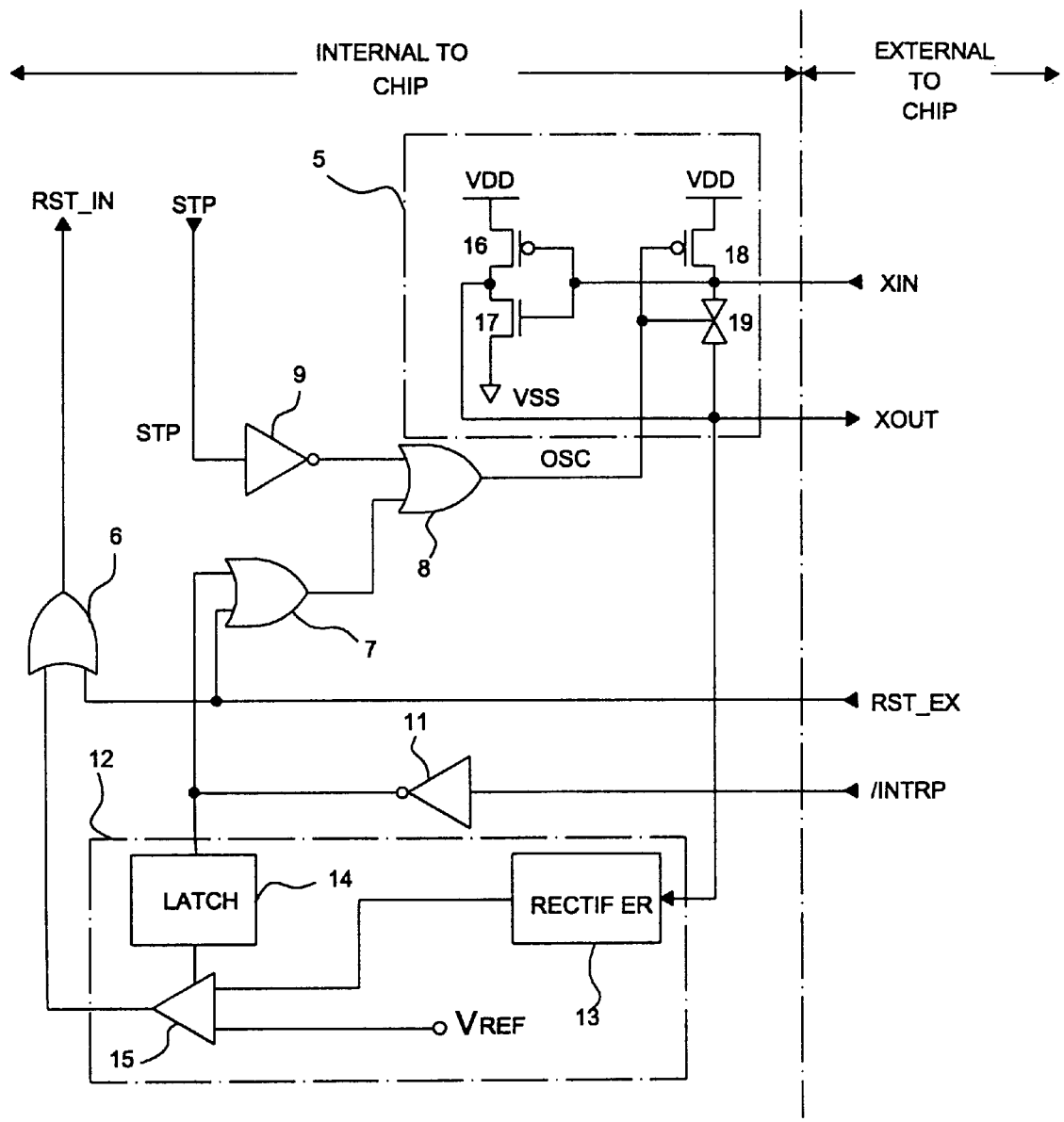
FIG. 3 is a circuit of a reset signal control stage of the one-chip microcomputer according to the present invention.

A preferred embodiment of the present invention described as above is shown in FIG. 3. FIG. 3 shows a reset signal control stage of the one-chip microcomputer according to the present invention.

An input signal of the clock oscillator circuit 5 includes an input oscillation signal XIN and a power saving mode signal STP, and an output signal includes an output oscillation signal XOUT. The input oscillation signal XIN is an oscillation signal which is output from external oscillation means such as a crystal oscillator populated on the printed circuit board outside of the chip and then provided to the inside of the chip, and the output oscillation signal XOUT is an oscillation signal which is provided to the oscillation means outside from the inside of the chip. The power saving mode signal STP is a signal that causes almost all of the hardware of the system to stop operating because the operation of the clock oscillation circuit 5 is interrupted. In other words, the power savings mode prevents the clock signal from being generated.

The clock oscillation circuit 5 includes a CMOS inverter that has a PMOS transistor 16 and a NMOS transistor 17. An output signal of the inverter is feedback to an input stage through a transmission gate 19 and this input stage is connected to the supply voltage terminal VDD through a PMOS transistor 18. The transmission gate 19 and the PMOS transistor 18 are controlled by one control signal OSC. At this time, since the transmission gate 19 is turned on by a high level signal, actually, the transmission gate 19 and the PMOS transistor 18 are operated alternatively.

If the control signal OSC is in the high level and thus the transmission gate 19 is turned on, the input oscillation signal XIN is oscillated by the action of the inverter, producing an output oscillation signal XOUT with a desired frequency. However, if the control signal is in the low level and thus the PMOS transistor 18 is turned on, the output signal XOUT always goes to the low level and thus oscillation does not occur since the high level signal is always provided. to the inverter by the supply voltage.

In Fig. 3, a constitution OSC for the logical gate for producing the control signal of the clock oscillation circuit 5 is now described. First, an exterior reset signal RST_EX is provided to the OR gate 7 and at the same time, an exterior interrupt signal /INTRP which is an active low signal is inverted and then provided to the OR gate 7. An output signal of the OR gate 7 is provided to another OR gate 8 together with the power saving mode signal STP which is inverted by the inverter 9. An output signal of the OR gate 8 is a control signal OSC which controls the oscillation operation of the clock oscillation circuit 5.

In order to activate a control signal of the clock oscillation circuit 5 to the high level, at least one of the power saving mode signal STP from the central processing unit 2 and the exterior interrupt signal /INTRP should be at the low level or the exterior reset signal RST_EX should be at the high level. That is, if an interrupt from the outside occurs during the power saving mode, or if the system is reset, the clock oscillation circuit 5 is operated.

The output oscillation signal XOUT from the clock oscillation circuit 5 and an inverted signal of the exterior interrupt signal /INTRP is provided to a reset signal control circuit 12 for controlling the interior reset signal RST_IN. The output oscillation signal XOUT is rectified by a rectifier 13 and then converted to a predetermined serial signal. The serial signal is provided to a comparator 15 and is compared to the reference voltage VREF. The reference voltage of the comparator 15 is set to be coincided with the level of the serial signal which is produced when a normal output oscillation signal XOUT is rectified. The comparator 15 produces a low level signal when the input voltage (i.e., a serial voltage from the rectifier) level is above the reference voltage VREF and produces a high level signal when the input voltage level is below the reference voltage VREF.

Accordingly, when the output oscillation signal XOUT which is provided to the rectifier 13 goes to the stabilized level, the rectifier 13 also produces a high level serial signal in accordance with the output oscillation signal, and thus the output signal of the comparator 15 goes to the low level. The external interrupt signal /INTRP is inverted by the inverter 11 and then provided to the latch 14, and the comparator 15 is activated and then produces an output signal if the exterior interrupt signal /INTRP stored in the latch 14 is in the high level. The reason to transmit the exterior interrupt signal /INTRP to the comparator 15 through the latch 14 is for maintaining the value of the current interior reset signal RST_IN until the next exterior interrupt signal /INTRP has occurred.

In a power saving mode in which the exterior reset signal RST_EX is inactive at the low level and the power saving mode signal STP is activated to the high level, the output signal of the OR gate 8 goes to the low level and thus the clock oscillation circuit 5 is not operated. In this state, if the exterior interrupt signal /INTRP is activated to the low level, it is inverted to the high level by the inverter 11 and then provided to the latch 14 and the OR gate 7. As a result of it, the high level signal is output from the OR gate 8 and causes the clock oscillation circuit 5 to begin operating, and at the same time, and the high level signal is provided to the latch 14 and activates the comparator 15.

At this time, since the output oscillation signal XOUT from the clock oscillation circuit 5 to the rectifier 13 has not yet reached to the stabilized level, the signal from the rectifier 13 is also in a state lower than the reference voltage VREF. Accordingly, the comparator 15 continues to produce the high level signal and the OR gate 6 produces the interior reset signal RST_IN which is activated to the high level. If the clock oscillation circuit 5 continues to be operated and the output oscillation signal XOUT goes to the stabilized level, the rectifier 13 produces the serial signal which has the level (above the reference voltage VREF) in accordance with the output oscillation signal. Such a serial signal converts the output signal of the comparator 15 to the low level and thus inactivates the interior reset signal RST_IN to the low level.

Figure 4:
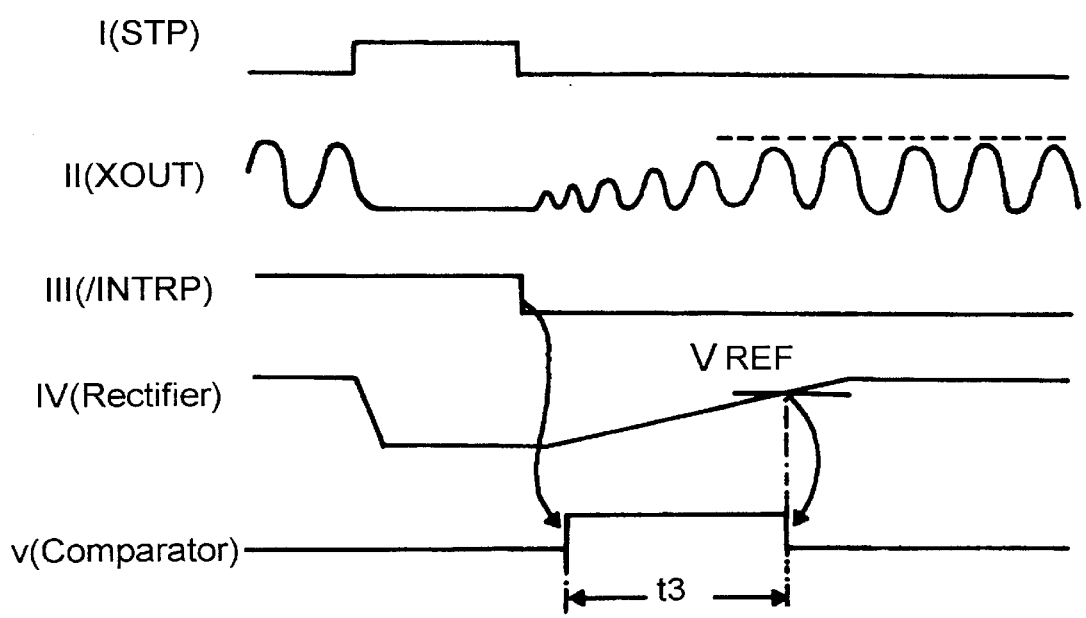
FIG. 4 is a timing diagram for representing the reset signal control operation of the one-chip microcomputer according to the present invention.

FIG. 4 shows a timing diagram representing the reset signal control operations of the one-chip microcomputer in FIG. 3 according to the present invention. In FIG. 4, I shows the power saving mode signal (STP), II shows the output oscillation signal XOUT, III shows the exterior interrupt signal (/INTRP), IV shows the output signal of the rectifier 13 and V shows the output signal (i.e., the interior reset signal) of the comparator 15.

When the power saving mode signal I is in the low level, an oscillation operation is accomplished in the clock oscillation circuit 5 and the output oscillation signal II is thus a normal oscillation signal. However, when the power saving mode signal I is in the high level, the clock oscillation circuit 5 is not operated and thus the output oscillation signal II is in the low level. If the exterior interrupt signal III is activated to the low level in the state that the power saving mode signal I is in the low level, the output signal V of the comparator goes to the high level. At this state, if the output signal IV of the rectifier rises above the reference voltage, the output signal V of the comparator goes to the low level and thus the interior reset signal also goes to the low level.

The time t3 is the duration that the output signal V of the comparator 15 is activated to the high level as triggered by the exterior interrupt signal. When the output V of the comparator 15 is inactivated again to the low level, this corresponds to the point in time that the output oscillation signal II (XOUT) of the clock oscillation circuit 5 reaches the stabilized level. Accordingly, unnecessary reset signal activating time after the oscillation operation is stabilized is not needed (as in the Related Art).

This invention offers effects to reduce the area occupied in the chip by constituting the reset signal control circuit using a rectifier and a comparator which occupies relatively small layout area. This also reduces the operation time needed to recognize a stabilized level of oscillation. The possibility of mis-operation due to noises can be avoided by maintaining the logical value of the current exterior interrupt signal until the next exterior interrupt signal is provided.

It will be apparent to those skilled in the art that various modification and variations can be made in the reset signal control circuit of the one-chip microcomputer of the present invention without departing from the spirit or scope of the inventions. Thus, it is intended that the present invention cover the modifications and variations of this invention provided they come within be scope of the appended claims and their equivalents.

What is claimed is:

1. A reset circuit for a single chip microcomputer, the circuit comprising:

a clock oscillator to generate a clock signal, said clock oscillator being operable to reset in response to an external reset trigger; and a reset control circuit to indicate when said clock oscillator has completed a reset operation, said reset control circuit including a rectifier to rectify the clock signal, and a comparator to output a reset signal indicative of whether a reset operation is complete by comparing an output of said rectifier against a reference voltage.

2. The reset circuit of claim 1, wherein an external interrupt signal is provided to the comparator through a latch.

3. The reset circuit of claim 1, wherein the reference signal is equivalent to a rectified voltage of a stabilized clock signal from the clock oscillator.

4. The reset circuit of claim 1, wherein said comparator outputs a high logic level if said output of said rectifier is less than said reference voltage.

5. The reset circuit of claim 1, wherein said clock oscillator is operable to suspend clock signal generation in response to a power saving mode signal.

6. The reset circuit of claim 1, wherein said peak detector is formed without transistors.

* * * * *